3,031,295
METHOD FOR PRODUCING TANTALUM
Wayne H. Keller, Waban, Mass., and George L. Martin, Tuscaloosa, Ala., assignors to National Research Corporation, Cambridge, Mass., a corporation of Massachusetts
No Drawing. Filed Feb. 15, 1960, Ser. No. 8,507
3 Claims. (Cl. 75—84.4)

This invention relates to the production of tantalum metal in very pure form.

The principal object of the present invention is to provide an improved process for producing tantalum metal which can be converted into usefully ductile material without the necessity of high vacuum sintering operations to remove oxygen.

Another object of the invention is to provide an improved method for producing tantalum which provides relatively large crystalline aggregates having ultimate crystal face dimensions on the order of 5 to 100 microns.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

In the present invention, tantalum is produced by confining a mass of $K_2TaF_7$ in an air-free reaction chamber. This reaction chamber is maintained at an elevated temperature so as to maintain the $K_2TaF_7$ in a molten phase. In a preferred embodiment, the main body of the bath is maintained substantially above 800° C. and the surface of the bath is cooled by an appreciable amount so that the surface is maintained at a temperature which is not substantially above the boiling point of sodium. However, this surface temperature must be at a sufficiently high temperature, above 800° C., so that the surface has a least the fluidity of a slush. Metallic sodium is fed onto the surface of the liquid mass in the reaction chamber, sodium being preferably fed at a relatively slow rate on the order of 1 to 5 pounds per hour per square foot of liquid surface until an amount of sodium has been fed which is enough to substantially completely reduce all of the potassium fluotantalate to tantalum. The reaction mass is held at a temperature above the melting point of the mass for at least 2 hours after addition of the sodium has ceased. Thereafter the metallic tantalum is separated from the byproduct sodium fluoride and potassium fluoride. This separation is preferably accomplished by allowing the mass to freeze and then leaching the mass in a suitable aqueous acid system.

In order to more fully understand one detailed application of the invention, reference should be had to the following specific non-limiting example.

Example 1

Forty pounds of $K_2TaF_7$ is placed in an Inconel reactor 12 inches in diameter and 12 inches high. The reactor is sealed, and repeatedly evacuated and back filled with argon to provide a slight positive pressure of a few millimeters above atmosphere. During this repeated evacuation and back filling with argon, the reactor is heated to 200° to 400° C. to assure removal of all water vapor and other gases or vapors. The reactor is then heated to 925° C. and 10.58 pounds of sodium (10% deficient) is fed in liquid form to the reactor, sodium being spread across the surface of the molten $K_2TaF_7$ and being fed to the reactor at a rate of about 1.5 pounds per hour (i.e. about 2 pounds per hour of molten salt surface). At the end of the sodium feed the reactor temperature is increased to 950° C. and the molten mass is maintained at this temperature for 4 hours. The reactor is then cooled, opened up and leached in a number of successive leaches as set forth below:

A. Leaches 1 and 2—12.5 pounds of $AlCl_3.6H_2O$ in 25 gal. 5% HCl
B. Leaches 3 and 4—25 gal. of ½% HF—1.7% $H_2O_2$
C. Leaches 5 and 6—10 gal. of 2% HCl
D. Leach 7—6 gal. of 5% HCl with 3.0 pounds $AlCl_3.6H_2O$
E. Leach 8—6 gal. of ½ HF—1.7% $H_2O_2$
F. Leaches 9 and 10—10 gal. of 2% HCl
G. Leaches 11 and 12—5 gal. of 1% HCl
H. Leaches 13 to 17—5 gal. of distilled $H_2O$
I. Leaches 18 and 19—2 gal. of absolute methanol
J. Vacuum dry product at 50° C. for 8 hours.

The product had a number of relatively long needles of tantalum of about one inch long by $\frac{1}{16}$ to $\frac{1}{8}$ inch thick. Practically all of the product was in the form of crystalline aggregates wherein the ultimate crystal size (i.e. the actual measured crystal faces of the individual crystals) was on the order of 5 to 100 microns or above. The product had a Brinell hardness number of 111 BHN and an oxygen content of 0.022%.

Example 2

This run was very similar to Example 1 except that 150 pounds of $K_2TaF_7$ was fed to the reactor initially. Accordingly, the reaction time was extended considerably since the feed of sodium was maintained at about 1.5 pounds per hour. At the end of the sodium feed the reactor was maintained at a temperature of 950° C. for about 8 hours and then cooled. The byproduct salt and tantalum was leached in a manner similar to Example 1 except that $Al_2(SO_4)_3$ and $H_2SO_4$ were substituted for the $AlCl_3$ and HCl employed in the first two leaches of Example 1. The final product was similar to that obtained in Example 1, having an oxygen content of 0.019%.

Example 3

This run was similar to Example 1 except that 600 pounds of $K_2TaF_7$ were placed in the reactor initially. The mass was heated to about 900° C. and the feed of sodium to the surface was maintained at about 4.1 pounds per hour. The feed of sodium cooled the surface somewhat to a temperature of about 850° C. while the main body of the bath was maintained at 900° C. After about 97% of the sodium necessary for stoichiometric reaction had been fed, sodium feed was stopped and the reaction was maintained at a temperature of 950° C. for 4 hours. It was then cooled and the byproduct salt and tantalum were leached in a manner similar to Example 1.

Example 4

This example was similar to Example 3 except that the temperature at the top of the bath was maintained at 823° C., and the temperature within the bath was maintained at 885° C.

In above Examples 3 and 4, the product was similar in form and purity to that obtained in Examples 1 and 2. In both of these examples the surface of the bath was somewhat below the temperature of 880° C., which corresponds to the point at which the stoichiometric byproduct mixture of KF—NaF is completely liquid. This mixture accordingly is a slushy combination of sodium fluoride crystals floating in molten sodium fluoride and potassium fluoride. There is also present $K_2TaF_7$ which is unreduced. Naturally the percentage of this latter constituent changes continually during the reduction. While it is desirable that the system be as free from nonfluid constituents as possible, the presence of some slushy material is not a detriment so long as the cooling at the surface does not permit freezing of a solid crust across the surface. Accordingly, it is essential to control the heat input, sodium feed rate and sodium reflux rate so as to prevent formation of a solid crust which greatly interferes with the proper introduction of sodium or NaK into the reaction mass.

In connection with the above discussion, the invention has been particularly described with the use of sodium or NaK as the reducing agent. It is equally feasible to use lithium or potassium. Economic considerations drastically limit the desirability of these other reducing agents. While a preferred embodiment has been described wherein the reactor is charged initially with pure $K_2TaF_7$, it is possible to dilute the $K_2TaF_7$ by the addition of a pure salt, such as sodium chloride, KCl, etc. This can have the advantage of forming a complex salt system having a somewhat lower melting point or higher solubility for NaF than the specific system described above.

While several specific embodiments of the invention have been described above, numerous modifications thereof may be practiced without departing from the spirit of the invention. For example, the feed rate may be considerably faster than that illustrated, particularly in later parts of the run. After about 20 to 30% of the $K_2TaF_7$ has been reduced to tantalum metal, the reaction rate appears to slow down very substantially and it appears that there is a definite limit at which the molten mass will take up sodium or the potassium which is formed by reaction between sodium and KF in the molten mass. Accordingly, during the latter part of the run all of the desired sodium may be fed at once without unduly accelerating the reduction rate. However, there is no particular advantage to be gained by so feeding the sodium and considerable refluxing thereof is experienced when the reactor is maintained above 900° C., as is preferable.

The temperature should be sufficiently high to assure that the reaction mass is maintained molten, although it should not be so high that the equilibrium vapor pressure of the sodium (or potassium or sodium-potassium alloy) is so high that the reactor must be maintained at much above atmospheric pressure. By refluxing sodium or NaK from the reactor head and an appropriate venting condenser, it is possible to maintain, in the reaction mass, a temperature which is somewhat higher than would be indicated by the absolute pressure in the system.

This application is in part a continuation of our copending application Serial No. 706,299 filed December 31, 1957, now abandoned.

Since certain changes may be made in the above process without departing from the scope of the invention herein involved, it is intended that all matter contained in the above description, shall be interpreted as illustrative and not in a limiting sense.

What is claimed is:

1. The process of producing tantalum metal which comprises confining a liquid bath of potassium fluotantalate in an air-free reaction chamber, feeding sodium to the surface of the liquid bath in the reaction chamber to reduce said fluotantalate to tantalum metal, maintaining said reaction chamber at a temperature sufficiently above 800° C. to maintain the main body of said bath in liquid phase while cooling the surface of the bath an appreciable amount so that the surface of said bath is maintained at a temperature which is below the temperature of the main body and not substantially above the boiling point of sodium but sufficiently above 800° C. to have at least the fluidity of a slush, the feeding of the sodium to the reaction mass being continued until there is fed an amount of sodium necessary to substantially completely reduce the potassium fluotantalate to tantalum, holding the reaction mass at a temperature above the melting point of the mass for at least 2 hours after the addition of said amount of sodium and thereafter separating the tantalum from the byproduct sodium fluoride and potassium fluoride.

2. The process of producing tantalum metal which comprises confining a liquid bath of potassium fluotantalate in an air-free reaction chamber, feeding sodium to the surface of the liquid bath in the reaction chamber to reduce said fluotantalate to tantalum metal, the sodium being fed at a rate less than 5 pounds per square foot of liquid surface per hour until about 30% of the stoichiometric amount of sodium has been added, maintaining said reaction chamber at a temperature sufficiently above 800° C. to maintain the main body of said bath in liquid phase while cooling the surface of the bath a sufficient amount so that the surface of said bath is maintained at a temperature which is below the temperature of the main body and not substantially above the boiling point of sodium but sufficiently above 800° C. to have at least the fluidity of a slush, the feeding of the sodium to the reaction mass being continued until there is fed an amount of sodium necessary to substantially completely reduce the potassium fluotantalate to tantalum, holding the reaction mass at a temperature above the melting point of the mass for at least two hours after the addition of said amount of sodium, and thereafter separating the tantalum from the byproduct sodium fluoride and potassium fluoride.

3. The process of producing tantalum metal which comprises confining a liquid bath of potassium fluotantalate in an air free reaction chamber, adding a diluent salt to said potassium fluotantalate bath, feeding a reducing agent selected from the group consisting of sodium, potassium, NaK, and lithium to the surface of the liquid bath in the reaction chamber to reduce said fluotantalate to tantalum metal, maintaining said reaction chamber at a temperature sufficiently above 800° C. which will maintain the main body of the bath, including the reaction byproducts, in liquid phase while cooling the surface of the bath an appreciable amount so that the temperature of the surface has as a lower limit a temperature which is below the temperature of the main body but sufficiently above 800° C. to provide at least the fluidity of a slush and having as an upper limit a temperature which is not substantially above the boiling point of the reducing agent, the feeding of the reducing agent to the reaction mass being continued until there is fed an amount necessary to substantially completely reduce the potassium fluotantalate to tantalum, holding the reaction mass at a temperature above the melting point of the mass for at least 2 hours after the addition of said amount of reducing agent and thereafter separating the tantalum from the byproducts.

No references cited.